April 24, 1928.
R. G. HILL
1,666,966
PISTON AND PISTON RING CONSTRUCTION
Filed June 3, 1927
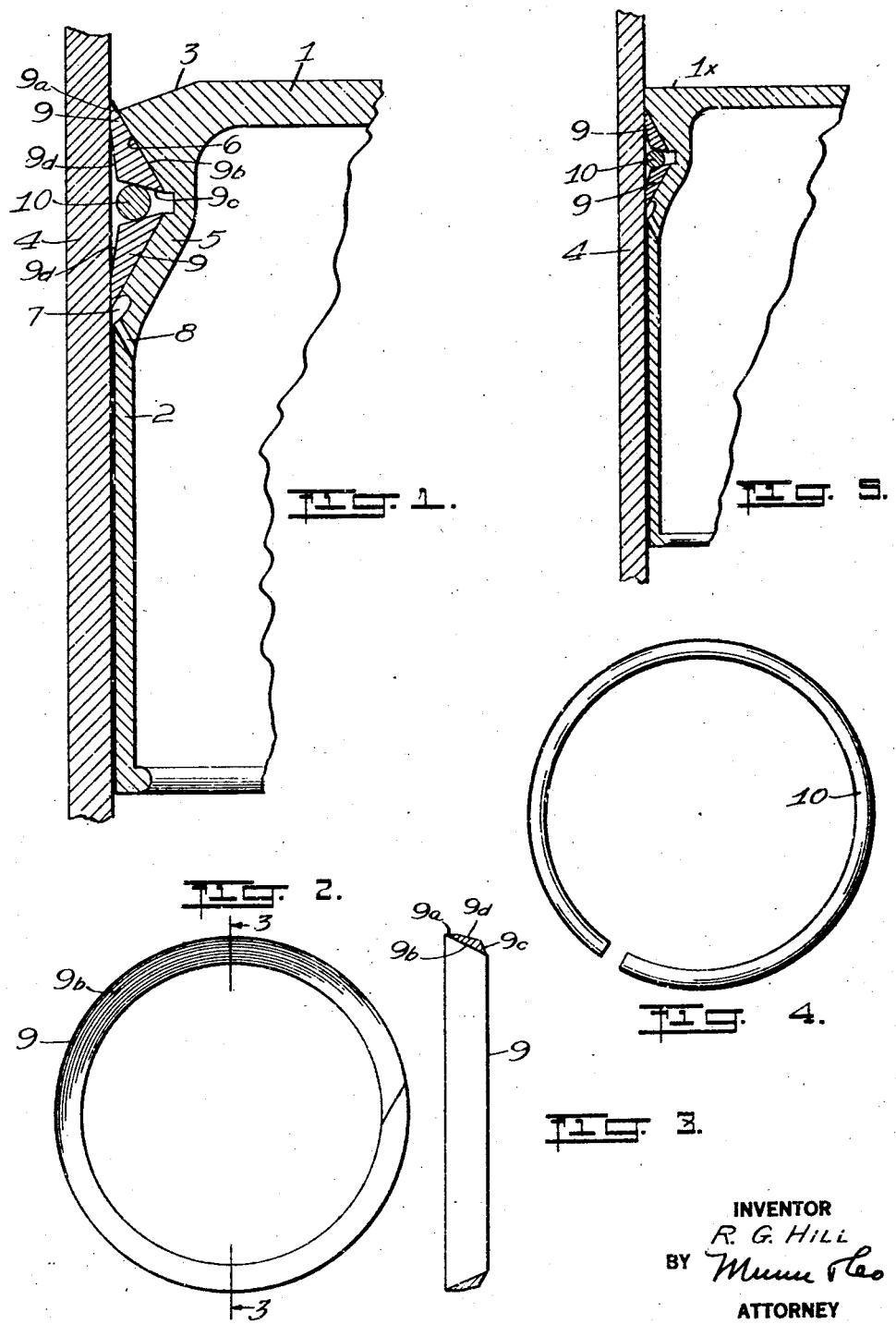
INVENTOR
R. G. Hill
BY Munn & Co.
ATTORNEY Patented Apr. 24, 1928.

1,666,966

UNITED STATES PATENT OFFICE.

ROSCOE GOULD HILL, OF RIVER FALLS, WISCONSIN, ASSIGNOR OF ONE-HALF TO FREDERIC X. KNOBEL, OF RIVER FALLS, WISCONSIN.

PISTON AND PISTON-RING CONSTRUCTION.

Application filed June 3, 1927. Serial No. 196,317.

My invention relates to improvements in pistons and piston rings, and it consists in the combinations, constructions, and arrangements herein described and claimed.

An object of my invention is to provide a novel form of piston construction of the type in which piston rings are carried in grooves in the piston and are held by means of spring tension against the walls of the cylinder, the piston rings in the present instance being provided with thin, flexible edges which are held closely to the wall of the cylinder by the expanding gas.

A further object is to provide a piston ring construction in which the scoring of the cylinder or of the ring is prevented, while at the same time the rings afford a tight seal for preventing the passage of gases.

A further object is to provide a piston ring construction in which the thin, flexible edges are maintained, even though the contacting surface of the rings should be worn.

A further object is to provide a construction in which excessive pressure on the cylinder wall, which otherwise might cause sticking or scoring, is obviated.

Other objects and advantages will appear in the following specification, and the novel features of the invention will be particularly pointed out in the appended claims.

My invention is illustrated in the accompanying drawings, forming part of this application, in which Figure 1 is a longitudinal sectional view through a portion of a piston and cylinder showing the piston rings, Figure 2 is a face view of one of the piston rings, Figure 3 is a section along the line 3—3 of Figure 2, Figure 4 is a face view of a spring ring, and Figure 5 is a sectional view similar to Figure 1, showing a modified form of the device.

In carrying out my invention, I provide a piston such as that shown in Figure 1 having a head 1 and side walls 2. In the present instance, the head is shown as having a bevelled portion 3 adjacent to the cylinder wall 4.

The piston has an enlargement at the junction of the head with the wall 2, as shown at 5. This enlargement has an annular groove 6, V-shaped in cross section, which groove, as it will be observed, intersects the bevelled portion 3 of the head near the outer edge thereof; i. e., adjacent to the inner wall of the cylinder 4.

The portion 5 is also provided with an auxiliary circumferential groove 7 adjacent to the wall of the cylinder 4, and this groove communicates by means of passages such as that shown at 8 with the interior of the piston.

Disposed in the groove 6 are upper and lower piston rings 9. These rings are precisely alike, although they are in opposed positions. It will be noted that each ring has a cylinder-contacting surface $9^a$, a surface $9^b$ angularly disposed thereto and in slidable contact with the walls of the V-shaped groove, a surface $9^c$ in slidable contact with the spring ring 10, and a surface $9^d$ angularly disposed with respect to the surfaces $9^c$ and $9^a$.

From the foregoing description of the various parts of the device, the operation thereof may be readily understood. The rings are assembled with their cylinder-contacting surfaces disposed at opposite directions. The spring ring 10 tends to contract, and in doing so it forces the rings 9 outwardly into close engagement with the inner walls of the cylinder. When the piston becomes hot, the ring 10 tends to expand, thus allowing the rings 9 to slide inwardly so as to prevent these rings from scoring the cylinder walls and also preventing excessive wear on the rings themselves. It will be noted that in the construction shown in Figure 1, the edge of the upper ring projects beyond the bevelled portion of the piston head. This portion of the ring is thin and flexible and the pressure of the gas tends to hold it closely to the cylinder. I regard this an important feature of the invention because the edge is thus kept against the cylinder wall, whereas in the conventional type of piston ring the inertia of the ring prevents it expanding to the enlarged middle section of a worn cylinder.

As the piston rings are worn, the spring ring 10 will move them outwardly so that at all times they are in intimate contact with the inner walls of the cylinder and the thin, flexible edges are of course maintained always at the same angle. The excessive oil which is scraped off by the piston ring collects in the groove 7 and is lead by the passage 8 into the interior of the piston and thence to the crank case.

In addition to the force exerted by the spring ring 10, there is a tendency, due to the frictional contact with the walls of the cylinder, for the rings to be wedged outwardly. This further tends to keep the piston rings in close contact with the walls of the cylinder.

In Figure 5, I have shown a modified form of the device in which the cylinder head 1ˣ is flat. In this form of the device, the rings 9 are held by the spring ring 10 against the wall of the cylinder 4 in the same manner as described in connection with Figure 1. In this instance, however, the upper ring does not project beyond the head of the cylinder.

The device of the type described above provides a piston and piston ring construction which may be readily assembled, which operates automatically to prevent scoring when the piston is hot, which automatically adjusts itself when worn, and in which the relation of the annular positions of the rings is at all times maintained the same.

I claim:

1. The combination with a piston having an annular groove V-shaped in cross section, of a pair of piston rings, each having a surface arranged to bear on a wall of the groove, and a contractile spring ring arranged to bear simultaneously on said piston rings and tending to force them outwardly.

2. The combination with a piston having a circumferential V-shaped groove, of a pair of piston rings, each of said piston rings having a surface arranged to engage a cylinder wall, a surface arranged to engage a wall of the V-shaped groove, and a cam surface, and a contractile spring ring disposed between said pistons rings and arranged to engage the cam surfaces of said rings for forcing them outwardly.

3. The combination of a piston having a circumferential groove of V-shaped cross section, a pair of piston rings disposed in said groove, each of said piston rings having a surface arranged to engage the wall of a cylinder, a surface in engagement with a wall of the V-shaped groove, and a cam surface angularly disposed with respect to the cam surface of the opposing piston ring, and a contractile spring ring disposed between the cam surfaces of the opposed piston rings for forcing said rings outwardly.

4. The combination of a piston having a circumferential groove of V-shaped cross-section, a pair of piston rings disposed in said groove, each of said piston rings having a surface arranged to engage the wall of a cylinder, a surface in engagement with a wall of the V-shaped groove, and a cam surface angularly disposed with respect to the cam surface of the opposing piston ring, and a contractile spring ring disposed between the cam surfaces of the opposed piston rings for forcing said rings outwardly, one of said rings having a portion thereof extending beyond the piston head and being subject to the pressure of the motive fluid acting on the piston head.

5. The combination of a piston having a circumferential groove V-shaped in cross section, an auxiliary circumferential groove adjacent one edge of said V-shaped groove and a passageway for affording communication between said last-named groove and the interior of the piston, a pair of piston rings disposed in said V-shaped groove, each of said piston rings having a surface arranged to engage the wall of a cylinder, a surface in slidable engagement with a wall of said V-shaped groove and a cam surface, the cam surfaces of the piston rings being angularly disposed with respect to one another, and a spring ring disposed in the groove and arranged to bear on the cam surfaces of said piston rings and tending to force said piston rings outwardly.

ROSCOE GOULD HILL.